(12) United States Patent
Pinaud et al.

(10) Patent No.: US 11,766,980 B2
(45) Date of Patent: Sep. 26, 2023

(54) DEVICE FOR REMOVABLY MOUNTING AN AIRBAG MODULE ON A STEERING WHEEL

(71) Applicant: Autoliv Development AB, Vargarda (SE)

(72) Inventors: Jonathan Pinaud, Chire-en-Montreuil (FR); Laurent Groleau, Quincay (FR); Alexander Feicht, Sigmertshausen (DE)

(73) Assignee: Autoliv Development AB, Vårgårda (SE)

( * ) Notice: Subject to any disclaimer, the term of this patent is extended or adjusted under 35 U.S.C. 154(b) by 1 day.

(21) Appl. No.: 17/597,927

(22) PCT Filed: Jul. 22, 2020

(86) PCT No.: PCT/EP2020/070655
§ 371 (c)(1),
(2) Date: Jan. 28, 2022

(87) PCT Pub. No.: WO2021/018686
PCT Pub. Date: Feb. 4, 2021

(65) Prior Publication Data
US 2022/0258689 A1 Aug. 18, 2022

(30) Foreign Application Priority Data

Jul. 29, 2019 (FR) .................................. 1908583

(51) Int. Cl.
*B60R 21/203* (2006.01)
(52) U.S. Cl.
CPC ................ *B60R 21/2035* (2013.01)

(58) Field of Classification Search
CPC .................................................. B60R 21/2035
See application file for complete search history.

(56) References Cited

U.S. PATENT DOCUMENTS

| 6,554,312 | B2 | 4/2003 | Sakane et al. |
| 10,875,564 | B2 * | 12/2020 | Minami ................. B62D 7/222 |
| 11,299,118 | B2 * | 4/2022 | Funk .................... B60R 21/2035 |
| 2001/0054810 | A1 * | 12/2001 | Sakane ............... B60R 21/2037 |
| | | | 280/728.2 |

(Continued)

FOREIGN PATENT DOCUMENTS

| CN | 205916072 U | * | 2/2017 | ........... B60R 21/203 |
| DE | 19725684 C1 | * | 12/1998 | ......... B60R 21/2037 |

(Continued)

*Primary Examiner* — Nicole T Verley
(74) *Attorney, Agent, or Firm* — Matthew D. Thayne; Thayne and Davis LLC

(57) ABSTRACT

The invention relates to a device for removably mounting an airbag module on a steering wheel, the mounting device comprises a mounting portion of a resilient ring for forming, in a locking position of the ring, an element for holding at least one hook on the other of the module or the steering wheel, the resilient ring having an unlocking position in which the mounting portion of the ring is no longer in the zone of interaction with the at least one hook, the device further comprises an element for releasing the ring, connected to one of the module or the steering wheel and arranged so as to move the ring during a movement for extracting the module such that the ring is placed back from the locking position.

16 Claims, 3 Drawing Sheets

(56) References Cited

U.S. PATENT DOCUMENTS

| | | | |
|---|---|---|---|
| 2004/0169358 A1* | 9/2004 | Fujita | B60R 21/2037 |
| | | | 280/731 |
| 2007/0210562 A1* | 9/2007 | Vigeant | B60R 21/2035 |
| | | | 280/728.2 |
| 2009/0309337 A1 | 12/2009 | Groleau et al. | |
| 2016/0297390 A1* | 10/2016 | Raikar | B60R 21/2035 |
| 2017/0361801 A1* | 12/2017 | Banno | B60R 21/2037 |
| 2020/0139915 A1* | 5/2020 | Funk | B60R 21/2037 |

FOREIGN PATENT DOCUMENTS

| | | | | |
|---|---|---|---|---|
| DE | 202021103776 U1 * | 9/2021 | | B60R 21/2037 |
| EP | 1167132 A2 | 1/2002 | | |
| EP | 1957324 A1 | 8/2008 | | |
| ES | 2266970 T3 * | 3/2007 | | B60R 21/05 |
| JP | 2009518233 A * | 5/2009 | | |
| JP | 2018171981 A * | 11/2018 | | |
| WO | WO-2019223969 A1 * | 11/2019 | | B60R 21/2035 |
| WO | WO-2022003089 A1 * | 1/2022 | | |

\* cited by examiner

[Fig. 1]
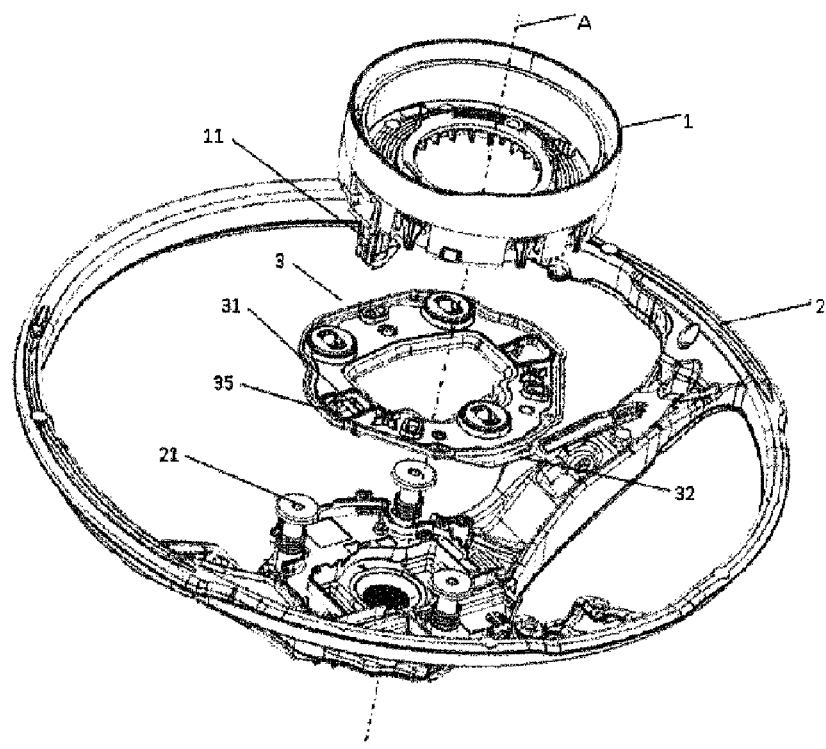
[Fig. 2]
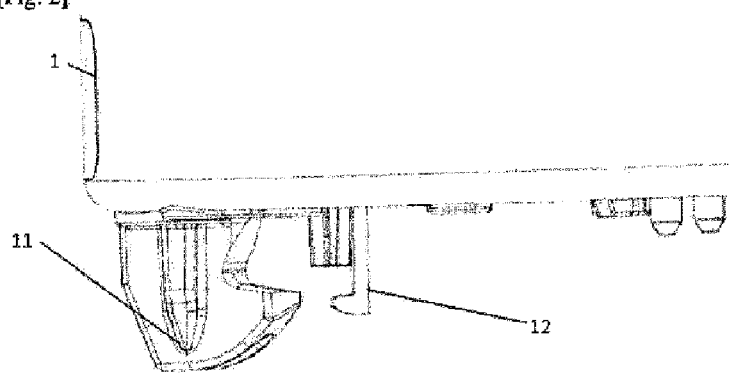

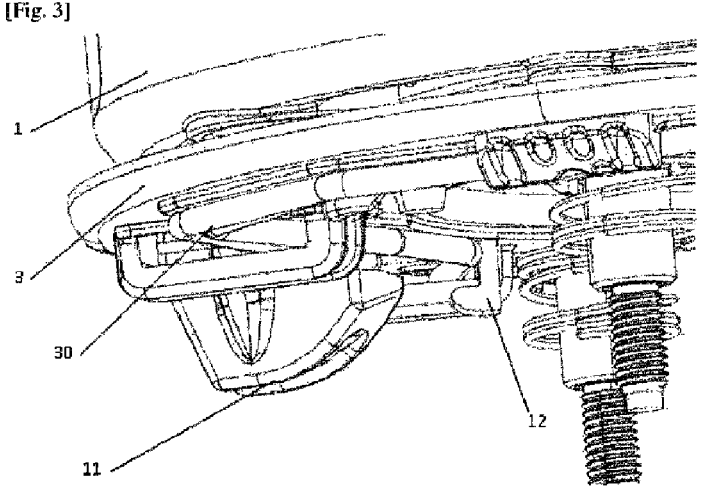
[Fig. 3]
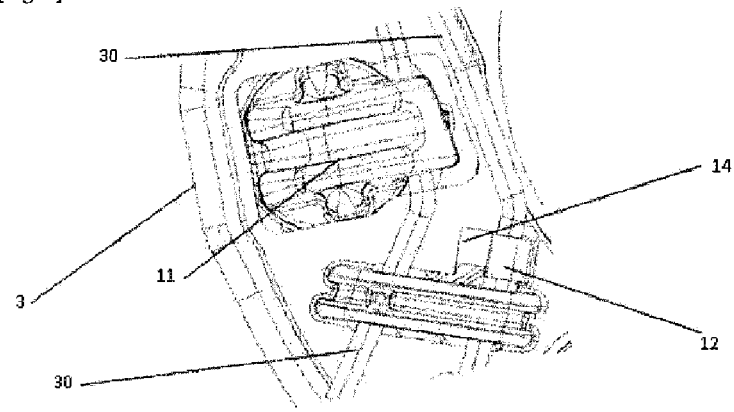
[Fig. 4]

[Fig. 5]
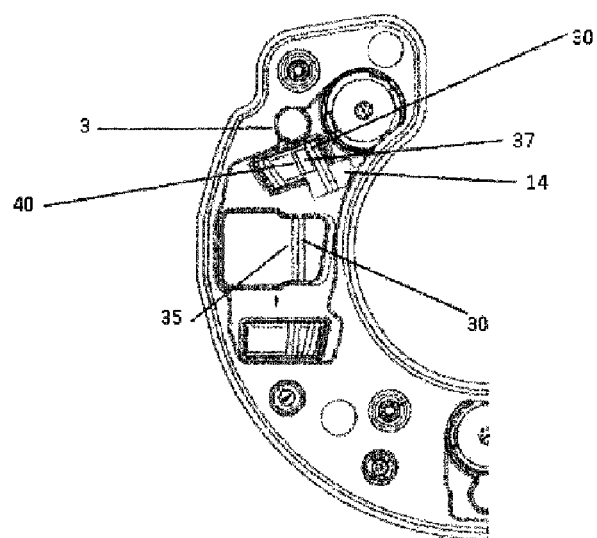
[Fig. 6]
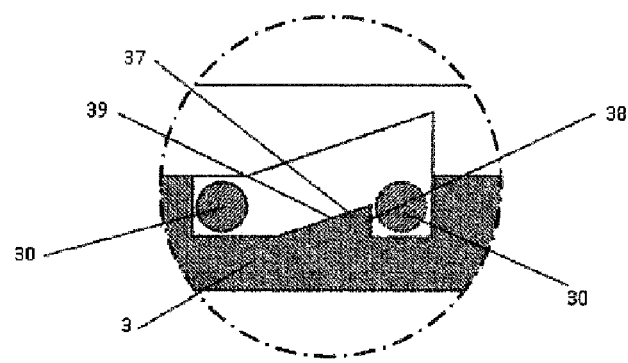
[Fig. 7]
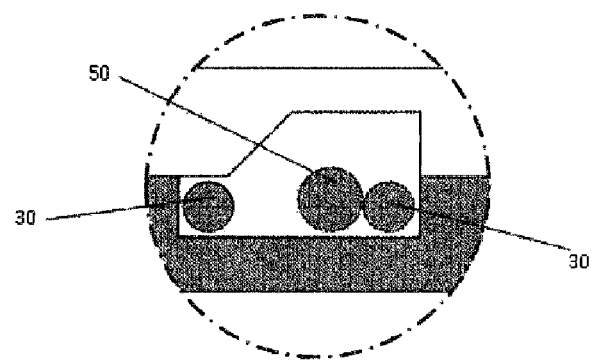

DEVICE FOR REMOVABLY MOUNTING AN AIRBAG MODULE ON A STEERING WHEEL

The present invention relates generally to a device for removably mounting an airbag module on a steering wheel.

Document EP1957324 describes a device for removably mounting an airbag module comprising a hook, integral with a module, interacting with a resilient ring in order to retain the module on the steering wheel. During the disassembly of the module, the resilient ring is held in the unlocking position in order to be able to extract the module without it being necessary to pivot the module. The module also comprises an actuating element which makes it possible to move the resilient ring into the locking position during the positioning of the module. The resilient ring is only moved by the actuating element when the module is depressed to a maximum, that is, beyond the nominal position thereof. There is therefore a risk that, during the mounting of the module, the maximum depression travel of the module is not reached, which results in the module not being attached.

One aim of the present invention is to respond to the disadvantages of the prior art document mentioned above and, in particular, to propose a removable mounting device wherein the locking of the airbag module is ensured after the resilient ring is held in the unlocking position during the disassembly of the module.

To this end, a first aspect of the invention relates to a device for removably mounting an airbag module on a steering wheel, the mounting device comprising at least one mounting hook connected to one of the airbag module or the steering wheel, the at least one mounting hook cooperating with at least one insertion element located on the other of the airbag module or the steering wheel, and a mounting portion of a resilient ring for forming, in a locking position of the resilient ring, an element for holding the at least one mounting hook on the other of the airbag module or the steering wheel in a zone of interaction with the at least one mounting hook, the resilient ring having an unlocking position in which the mounting portion of the resilient ring is no longer in the zone of interaction with the at least one mounting hook, characterized in that the removable mounting device further comprises an element for releasing the resilient ring, connected to one of the airbag module or the steering wheel and arranged so as to move the resilient ring during a movement for extracting the airbag module such that the resilient ring is placed back from the locking position or in the locking position.

Thus, it is understood that, during the disassembly of the airbag module, the resilient ring initially in the unlocking position is automatically repositioned in the locking position during the extraction of the airbag module. Thus, during the reassembly of the airbag module, the resilient ring is already in the disassembly position; any risk of reassembly without the ring being in the reassembly position is dispensed with. Thus, when the module is in the use position thereof, it is necessarily retained on the module.

According to another embodiment, the device for removably mounting an airbag module on a steering wheel may comprise a retaining element of the resilient ring connected to one of the airbag module or the steering wheel is arranged to hold the resilient ring in the unlocking position.

This retaining element makes it possible to hold the resilient ring in the unlocked position and as a result to be able to extract the airbag module without it being necessary to pivot the module during disassembly. This is particularly front when the clearances between the module and the steering wheel are very small. Such small clearances make the assembly more attractive, but prevent any possibility of rotating the module during the disassembly thereof.

According to another embodiment, the retaining element may comprise a lug comprising a stop for holding the resilient ring in the unlocking position thereof.

According to another embodiment, the lug may comprise a ramp to facilitate the movement of the resilient ring toward the unlocking position thereof, in which the resilient ring bears against the stop.

The ramp of the lug makes it possible to facilitate the movement of the resilient ring into the unlocking position against the lug.

According to another embodiment, the lug may be mounted on a resilient tab.

The presence of the resilient tab makes it possible to reduce the force required to move the resilient ring into the unlocking position, because it is able to deform in order to allow the resilient ring to pass, and can resume its initial position when the resilient ring reaches the unlocking position.

According to another embodiment, a tool for retaining the resilient ring, which is distinct from the airbag module and the steering wheel, can be provided in order to hold the resilient ring in the unlocking position.

According to another embodiment, the other of the airbag module or the steering wheel comprises an element for blocking the retaining tool in a position in which the retaining tool is arranged in order to hold the resilient ring (30) in the unlocking position.

According to another embodiment, the releasing element may comprise a releasing hook, the trajectory of which during the movement for extracting the airbag module meets the resilient ring when it is in the unlocking position.

According to another embodiment, the releasing hook may extend in a direction parallel to the extraction direction.

According to another embodiment, the height of the releasing hook may be strictly greater than the height of the at least one mounting hook.

Thus, the hook will be arranged to come into contact with the resilient ring only when the mounting hook is disengaged from the resilient ring.

According to another embodiment, the removable mounting device may comprise at least two mounting hooks, a mounting portion per mounting hook, and a retaining element per mounting portion.

According to another embodiment, when the airbag module is assembled on the steering wheel, the mounting hook may be in contact with the resilient ring and the releasing element (12) may be remote from the resilient ring by more than 1 mm, or even by more than 1.5 mm, in the extraction direction.

A second aspect of the invention relates to a method for disassembling a device for removably mounting an airbag module on a steering wheel according to the first aspect, characterized in that it comprises a step of moving the resilient ring into the unlocking position thereof, a step of extracting the airbag module such that the releasing element moves the resilient ring in order to place it back in the locking position.

Other characteristics and advantages of the present invention will become more apparent upon reading the detailed description of an embodiment of the invention, which is provided by way of example but in no manner limited thereto, and illustrated by the attached drawings, in which:

FIG. 1 shows a perspective view of a part of a steering wheel equipped with the removable mounting device according to the invention FIG. 2 shows a perspective view of an airbag module according to the invention;

FIG. 3 shows a detailed perspective view of the removable mounting device according to the invention which shows the unlocked position and the locked position of the resilient ring;

FIG. 4 shows a detailed view from beneath the removable mounting device according to the invention which shows the unlocked position and the locked position of the resilient ring;

FIG. 5 shows a mounting plate of the removable mounting device according to the invention which shows the unlocked position and the locked position of the resilient ring;

FIG. 6 shows a detailed sectional view of a first embodiment of the removable mounting device according to the invention which shows the unlocked position and the locked position of the resilient ring;

FIG. 7 shows a detailed sectional view of a second embodiment of the removable mounting device according to the invention which shows the unlocked position and the locked position of the resilient ring; The removable mounting device according to the invention will now be described with reference to FIGS. 1 to 7.

In a manner known per se, an airbag 1 module 1 is mounted on the steering wheel 2 via for example a mounting plate 3. The mounting plate 3 is attached to the steering wheel 2 via screws 21. The airbag module 1 is mounted on the mounting plate 3 by clip fastening. For this purpose, the mounting plate 3 comprises a plurality of openings or holes 35 through which hooks 11 of the airbag module 1 are introduced. The clip fastening of the module 1 to the mounting plate 3 is carried out via a resilient ring 30 (visible in FIG. 2) which interacts with the hooks 11 in a zone of interaction at the openings 35. According to the embodiment shown, the resilient ring 30 is mounted on the mounting plate 3, however variant embodiments in which the resilient ring 30 is mounted on or integral with the steering wheel armature 2 and/or the airbag module 1 can be envisaged. Obviously, if the resilient ring 30 is mounted on or integral with the airbag module 1, the hooks 11 are mounted on or integral with the steering wheel 2. The mounting plate 3 is not indispensable, the airbag module 1 could be mounted directly on the steering wheel 1. The mounting plate 3 can also support a part of the horn system.

It is understood that, in order to disassemble the airbag module 1, it is necessary to move the resilient ring 30 into an unlocking position wherein it is outside the zone of interaction at the openings 35. When the airbag module 1 is mounted on the steering wheel 2, in particular via the mounting plate 3 via at least two mounting hooks 11, it is not always possible to disassemble the airbag module 1 by disengaging the mounting hooks 11 one after the other. Indeed, disengaging a first hook then a second hook requires tilting or moving the airbag module 1. In some cases, the functional clearance between the airbag module 1 and the steering wheel 2 is too small to allow this movement or tilting.

In this case, or in order simply to facilitate the disassembly of an airbag module 1, the mounting plate 3 may comprise a retaining element 37 of the resilient ring 30, which can be seen in particular in FIGS. 5 to 7. The retaining element 37 is arranged to hold the resilient ring 30 outside the zone of interaction after said ring has been moved. The retaining element 37 is for example a lug formed on the mounting plate 3. More specifically, the lug is formed on the face of the plate 3 on which the resilient ring 30 is mounted.

The lug 37 may comprise a first portion 38 forming a stop for the resilient ring 30 in order to hold it in the unlocking position. This first portion 38 forms, for example, a surface perpendicular to the plane of the mounting plate 3.

The lug 37 may comprise a second portion 39 forming a ramp in order to facilitate the movement of the resilient ring 30 toward the unlocking position thereof, in particular against the first portion 38. The first and second portion 38, 39, can be adjacent such that, when the resilient ring 30 is moved up to the end of the second portion 39, it abuts against the first portion 38. According to another embodiment, not shown, the lug 37 can comprise a joining portion between the first and the second portion, 38, 39.

According to another embodiment, the lug 37 may be mounted on a resilient tab 40 arranged on the mounting plate 3 such that the lug 37 can move substantially perpendicularly to the plane of the mounting plate 3. In other words, when the resilient ring 30 is moved into the unlocking position, the force applied to the lug 37 will cause the resilient tab 40 to bend, which will facilitate the passage of the resilient ring 30 over the lug 37. When the resilient ring 30 passes beyond the lug 37, the resilient tab 40 then places the lug 37 back in its initial position, such that the resilient ring 30 is then held in the unlocking position by the lug 37. It is understood that the resilient tab 40 makes it possible to reduce the force required to bring the resilient ring 30 into the unlocking position thereof.

According to another variant embodiment shown in FIG. 7, the lug 37 is replaced by a retaining or disassembly tool 50. During the disassembly of the airbag module, this retaining tool 50 can also be used to move the resilient ring 30 into the unlocking position thereof. When the unlocking position of the resilient ring has been reached, the retaining tool 50 is held in place on the mounting plate 3, for example via a blocking element such as a wedge or a stud (not shown), which can be either positioned on the mounting plate 3 or outside the steering wheel 2. In a manner known per se, during disassembly, the retaining tool 50 may be introduced into the steering wheel 2 by a hole made in a trim cover (not shown).

According to one characteristic of the invention, the airbag module 1 comprises an element 12 for releasing the resilient ring 30 when the latter is in the disassembly position. The releasing element is arranged to move the resilient ring 30 during the extraction of the airbag module 1. The movement of the resilient ring 30 by the releasing element 12 then causes the resilient ring to return to the locking position. It is then understood that, after extracting the airbag module 1 from the steering wheel 2, the resilient ring 30 is automatically placed back in the locking position in order to ensure the locking of the airbag module 1 on the steering wheel 2 during the reassembly of the airbag module 1.

According to a variant embodiment of the invention, the releasing element comprises a releasing hook 12 integral with the airbag module 1. The releasing hook 12 extends, for example, in a direction substantially parallel to the extraction direction of the airbag module 1. In the example embodiment shown in FIGS. 1 to 7, the extraction direction is substantially parallel to the axis A of rotation of the steering wheel. The releasing hook 12 is positioned such that the trajectory of the releasing hook 12 during the extraction movement of the airbag module 1 meets the resilient ring 30 when the latter is in the unlocking position. Thus, during the extraction movement, the releasing hook 12 will hook onto at the very least interact with the resilient ring 30. This interaction will then cause the resilient ring 30 to move, causing the resilient ring 30 to pass into the locking position thereof. The releasing hook 12 is of course oriented so as not to impede the movement of the resilient ring 30 from the unlocking position thereof to the locking position thereof.

More specifically, and according to the variant embodiment shown, the movement of the resilient ring 30 caused by the releasing hook leads to the movement of the resilient ring 30 for example beyond the stop of the lug 37 or the retaining tool 50. The resilient ring 30 is then no longer held in its unlocking position and thus resumes its locking position.

According to the variant shown in FIGS. 1 to 7, the releasing hook 12 extends in the same direction as the mounting hooks 11. The height of the releasing hook 12 is strictly greater than the height of the mounting hooks 11. Thus, during the extraction movement of the airbag module 1, the mounting hooks 11 will pass out of the zone of interaction with the resilient ring 30 before the releasing hook 12 causes the movement of the resilient ring. The return of the resilient ring 30 to the locking position thereof will therefore not be able to re-lock the airbag module 1 to the steering wheel 2 during the movement.

By way of example, when the airbag module is assembled on the steering wheel, the mounting hook (11) is in contact with the resilient ring (30) and the releasing hook (12) is remote from the resilient ring (30) by more than 1 mm, or even by more than 1.5 mm, in the extraction direction.

The mounting plate 3 may comprise an opening 14 for the passage of the releasing hook 12. This opening 14 is distinct from the openings 35 intended for the passage of the mounting hooks 11 of the airbag module 1.

The airbag module 1 is disassembled in the following manner:

The resilient ring 30 is firstly moved toward its unlocking position for at least one mounting hook 11 of the airbag module 1. This operation is carried out for example via the retaining tool 50 or any other means known per se. The resilient ring 30 can also be held in this position by the retaining element 37 or the retaining tool 50.

once the resilient ring 30 is outside the zone of interaction with the mounting hooks 11, the airbag module 1 is extracted. The extraction then causes the movement of the resilient ring 30 by the releasing element 12, causing the resilient ring 30 to move and to return to its locking position.

It will be understood that different modifications and/or improvements which are obvious for the person skilled in the art may be made to the different embodiments of the invention described in the present description without departing from the scope of the invention.

In particular, according to another variant embodiment, not shown, the mounting device does not comprise a mounting plate and the airbag module comprises the hooks. According to this variant embodiment, the steering wheel frame comprises insertion means for receiving the hooks of the airbag module. These insertion means can be in the form of openings as on the mounting plate, or simple notches. As with the variants described above, the resilient ring interacts with the hooks to hold the airbag module to the steering wheel.

According to another variant embodiment, not shown, the mounting device does not comprise a mounting plate and the steering wheel armature comprises hooks. According to this embodiment, the airbag module comprises insertion means for receiving the steering wheel hooks. These insertion means may be in the form of openings as on the mounting plate or simple notches or one or more holes, openings, grooves or recesses. The airbag module also comprises means for blocking the resilient ring. As with the variants described above, the resilient ring interacts with the hooks to hold the airbag module to the steering wheel.

The invention claimed is:

1. A device for removably mounting an airbag module to a steering wheel, the mounting device comprises:
   at least one mounting hook connected to one of the airbag module or the steering wheel, the at least one mounting hook cooperating with at least one insertion element located on the other of the airbag module or the steering wheel, and
   a mounting portion of a resilient ring for forming, in a locking position of the resilient ring, an element for holding the at least one mounting hook on the other of the airbag module or the steering wheel in a zone of interaction with the at least one mounting hook,
   the resilient ring having an unloscking position in which the mounting portion of the resilient ring is no longer in the zone of interaction with the at least one mounting hook,
   wherein the device further comprises an element for releasing the resilient ring, connected to one of the airbag module or the steering wheel and arranged so as to contact and automatically move the resilient ring during a movement of the airbag module with respect to the steering wheel for extracting the airbag module such that the resilient ring is placed back into from the locking position, wherein the element for releasing the resilient ring is distinct from the resilient ring.

2. The device for removably mounting an airbag module on a steering wheel according to claim 1, wherein a retaining element of the resilient ring connected to one of the airbag module or the steering wheel is arranged to hold the resilient ring in the unlocking position.

3. The device for removably mounting an airbag module on a steering wheel according to claim 2, wherein the retaining element comprises a lug comprising a stop for holding the resilient ring in the unlocking position thereof.

4. The device for removably mounting an airbag module on a steering wheel according to claim 3, wherein the lug comprises a ramp to facilitate the movement of the resilient ring toward the unlocking position thereof, in which the resilient ring bears against the stop.

5. The device for removably mounting an airbag module on a steering wheel according to claim 2, wherein the lug is mounted on a resilient tab.

6. The device for removably mounting an airbag module on a steering wheel according to claim 2, comprising at least two mounting hooks, a mounting portion per mounting hook, and a retaining element per mounting portion.

7. The device for removably mounting an airbag module on a steering wheel according to claim 1, wherein a tool for retaining the resilient ring, which is distinct from the airbag module and the steering wheel, is provided in order to hold the resilient ring in the unlocking position.

8. The device for removably mounting an airbag module on a steering wheel according to claim 7, wherein the other of the airbag module or the steering wheel comprises an element for blocking the retaining tool in a position in which the retaining tool is arranged in order to hold the resilient ring in the unlocking position.

9. The device for removably mounting an airbag module on a steering wheel according to claim 8, wherein the releasing hook extends in a direction parallel to the extraction direction.

10. The device for removably mounting an airbag module on a steering wheel according to claim 8, wherein the height of the releasing hook is strictly greater than the height of the at least one mounting hook.

11. The device for removably mounting an airbag module on a steering wheel according to claim 1, wherein the element for releasing the resilient ring comprises a releasing hook, the trajectory of which during the movement for extracting the airbag module meets the resilient ring when it is in the unlocking position.

12. The device for removably mounting an airbag module on a steering wheel according to claim 1, wherein, when the airbag module is assembled on the steering wheel, the mounting hook is in contact with the resilient ring and the releasing element is remote from the resilient ring by more than 1 mm, in the extraction direction.

13. A method for disassembling a device for removably mounting an airbag module on a steering wheel according to claim 1, the method comprising:

a step of moving the resilient ring into the unlocking position thereof; and a step of extracting the airbag module such that the releasing element moves the resilient ring in order to place it back in the locking position.

14. The device for removably mounting an airbag module on a steering wheel according to claim 1, wherein the device is configured such that the movement for extracting the airbag module requires no pivoting of the airbag module during disassembly.

15. The device for removably mounting an airbag module on a steering wheel according to claim 1, wherein the element for releasing the resilient ring extends in the same direction as the at least one mounting hook.

16. The device for removably mounting an airbag module on a steering wheel according to claim 1, wherein the element for releasing the resilient ring extends from the same structure as the at least one mounting hook.

* * * * *